(12) United States Patent
Chao et al.

(10) Patent No.: US 7,386,789 B2
(45) Date of Patent: Jun. 10, 2008

(54) METHOD FOR DETERMINING LOGICAL COMPONENTS OF A DOCUMENT

(75) Inventors: Hui Chao, San Jose, CA (US); Lei He, Savannah, GA (US); Jian Fan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 10/787,971

(22) Filed: Feb. 27, 2004

(65) Prior Publication Data
US 2005/0193327 A1  Sep. 1, 2005

(51) Int. Cl.
*G06K 15/02* (2006.01)

(52) U.S. Cl. .................. 715/239; 715/204; 715/234; 715/243; 715/276; 707/3

(58) Field of Classification Search ................ 715/513, 715/514, 531, 239, 204, 234, 243, 276; 345/619; 707/3
See application file for complete search history.

(56) References Cited

U.S. PATENT DOCUMENTS

| | | | |
|---|---|---|---|
| 5,767,978 A | | 6/1998 | Revankar et al. |
| 5,832,530 A | * | 11/1998 | Paknad et al. ............... 715/235 |
| 5,832,531 A | * | 11/1998 | Ayers ......................... 715/500 |
| 6,606,105 B1 | * | 8/2003 | Quartetti ..................... 715/853 |
| 6,654,758 B1 | * | 11/2003 | Teague ....................... 707/101 |
| 7,013,309 B2 | * | 3/2006 | Chakraborty et al. ..... 707/104.1 |
| 2003/0189724 A1 | * | 10/2003 | Kloosterman et al. ..... 358/1.18 |
| 2004/0004625 A1 | | 1/2004 | Chao |

FOREIGN PATENT DOCUMENTS

WO    WO 03/032202    4/2003

OTHER PUBLICATIONS

Stratify PDF User's Guide, Copyright 2001, Lantana Research Software Corporation, pp. 1-10.*
PDF Splitter, PDF Split and Merge Software, Copyright 2003, verypdf.com, Inc. p. 1 of 1.*
Online—"Stratify PDF User's Guide"—Aug. 2003.
Anjewierdan, A—"AIDAS: Incremental Logical Structure Discovery in PDF Documents"—2001.
Chao et al—"PDF Document Layout Study With Page Elements and Bounding Boxes"—Workshop on Document Layout Interpretation and it's Application—2001.
Kent, G.—"XML and PDE: Of Applications and Philosophy"—Planet PDF—Jul. 27, 2000.

* cited by examiner

*Primary Examiner*—Stephen Hong
*Assistant Examiner*—Matthew J Ludwig

(57) ABSTRACT

A method for determining logical components of a portable document format (PDF) document is disclosed. The method includes separating the document into a plurality of layers. A PDF document is created for each of the plurality of layers. The method also includes determining a logical structure for each layer. The logical structures of the plurality of layers are combined to determine the logical components of the PDF document.

20 Claims, 15 Drawing Sheets success story

HP

Printers

TEXT

TEXT

TEXT

TEXT

TEXT
TEXT
TEXT

TEXT

FIG. 3A

METHOD FOR DETERMINING LOGICAL COMPONENTS OF A DOCUMENT

BACKGROUND

Modification of electronic documents is known in the art. While PDF (Portable Document Format) documents were intended to be in a final presentation form, several plug-in tools are available for "touching up" the contents of the PDF documents. Plug-in tools, however, do not facilitate major modifications of PDF documents. Some tools convert contents of PDF documents into an editable form such as word processing. These tools may work well when the documents contain non-overlapping logical components on a page. The logical components may include bodies of text, graphics illustrations and images. If a page contains overlapping components, such as a body of text atop an image, the use of these tools tends to result in errors. Other tools require extensive user interaction and are often cumbersome to use to modify documents.

PDF documents preserve the look and feel of the original documents by describing the low-level structural objects or primitives such as characters, lines, curves and images and associated style attributes such as font, color, stroke, fill, etc. as known in the field of document processing. However, most PDF documents are untagged and do not contain basic high level logical structure information such as words, text lines, paragraphs for text and charts and logos or figures for graphical illustrations. As a result, the layout or the content of the document cannot be easily re-used, re-edited or modified. Reusing the layout of a PDF document may be desirable in variable data printing such as used in direct marketing or in preparing travel brochures for example. In this situation, a logical component may have to be replaced or modified. Images or figure illustrations may be replaced and body of text may be modified in revising the documents. The reuse and modification of contents is often desirable in document conversion as well.

At least some embodiments provide improved methods and apparatus for determining the logical components of a document.

SUMMARY

In one aspect, a method for determining logical components of a portable document format (PDF) document is disclosed. The method includes separating the document into a plurality of layers. A PDF document is created for each of the plurality of layers. The method also includes determining a logical structure for each layer. The logical structures of the plurality of layers are combined to determine the logical components of the PDF document.

BRIEF DESCRIPTION OF THE DRAWINGS

The accompanying drawings, which are incorporated in and constitute a part of the specification, illustrate an embodiment of the invention and, together with the description, explain the invention. In the drawings.

FIGS. 3a-3c illustrate the various layers of the PDF document;

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

A PDF document includes page objects. Page objects are low-level structural objects such as text objects, image objects and path objects that are described in the PDF specification. Text objects are a group of characters having similar attributes such as font, color, character spacing, etc. Path objects are also referred to as vector graphics objects or drawings and paintings composed by lines, curves and rectangles. Page objects in a PDF document neither reflect nor are related to the logical structure or logical components of the document. For example, a text object may only contain only a portion of the characters making up a word. Similarly, path objects, which are the building blocks for graphical illustrations such as bar charts, pie charts and logos, may consist of vector graphics primitives such as lines, curves and rectangles or may be part of the illustration (e.g. one bar in a bar chart). A PDF document may contain a combination of one or more of these objects.

Figure 1:
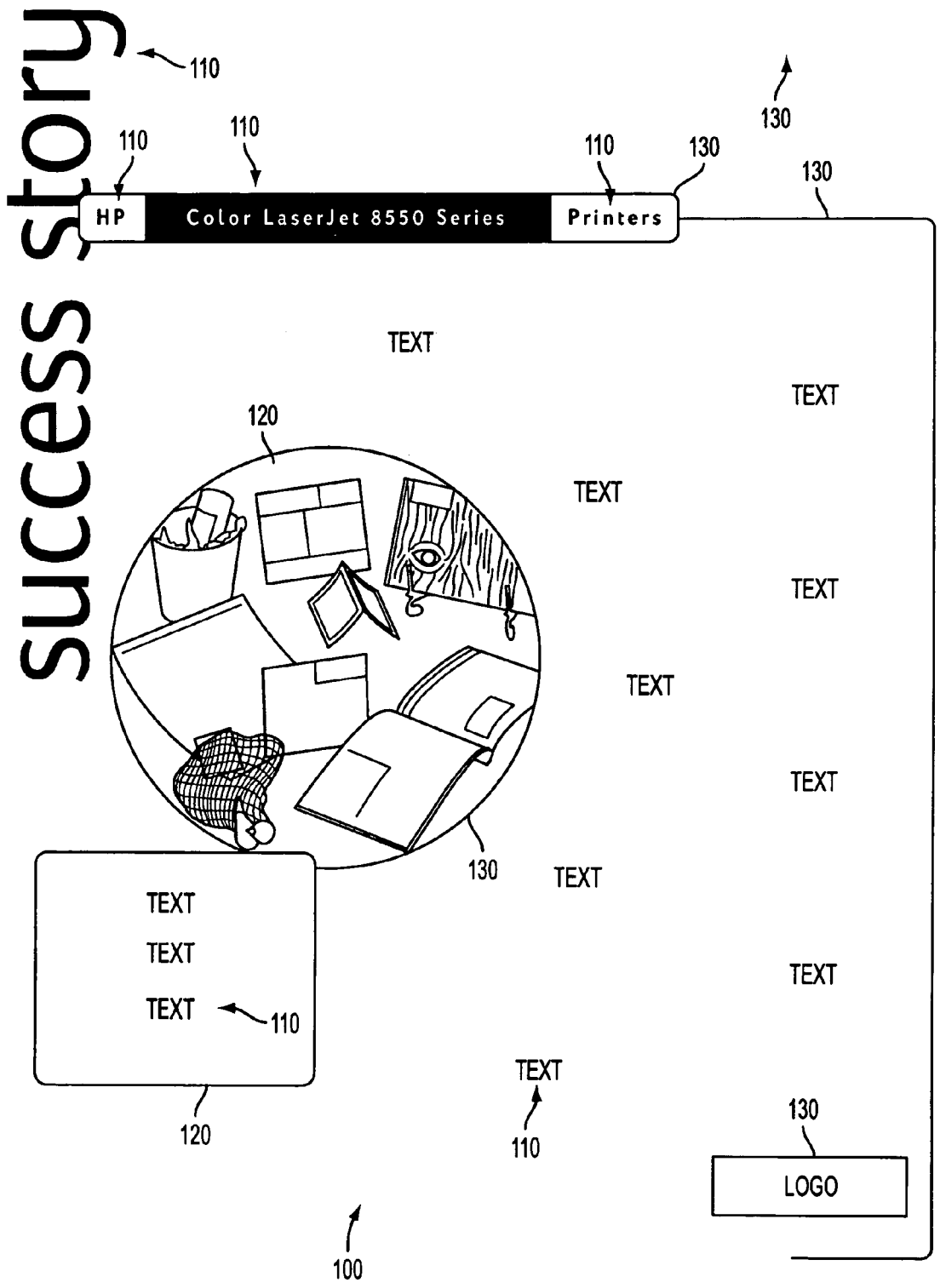
FIG. 1 illustrates a PDF document.

An exemplary PDF document 100 is illustrated in FIG. 1. Document 100 includes text 110, image 120 and vector graphics (or, path) objects 130. PDF documents provide layout information and attributes of the page objects. This may include the position (i.e. coordinates) and the layer index of a page object within the document (the order in which they are placed on the page) and the style of the objects. For text, the text style may include font type, font size and color of the text for example. For an image, the image style may include the size, the special effects, the outline of the visible portion and the color space used in the image for example. For graphical objects, such as a colored box, the style may include the color of the boundary as well as that of the fill for example.

As described above, page objects in a PDF document are not related to a logical structure or logical components of the document. In an exemplary embodiment, logical components of a PDF document 100 may be determined utilizing the layout information and attributes provided by the PDF document 100. Homogeneous logical components, such as bodies of text as text components, images as image components and graphical illustrations as vector graphics components, may be segmented by identifying an outline of the region occupied by the logical components; the attributes (such as layout style) and associated contents of the logical components may be extracted. Both the layout style and the contents may be expressed in extensible markup language (XML).

Figure 2A:
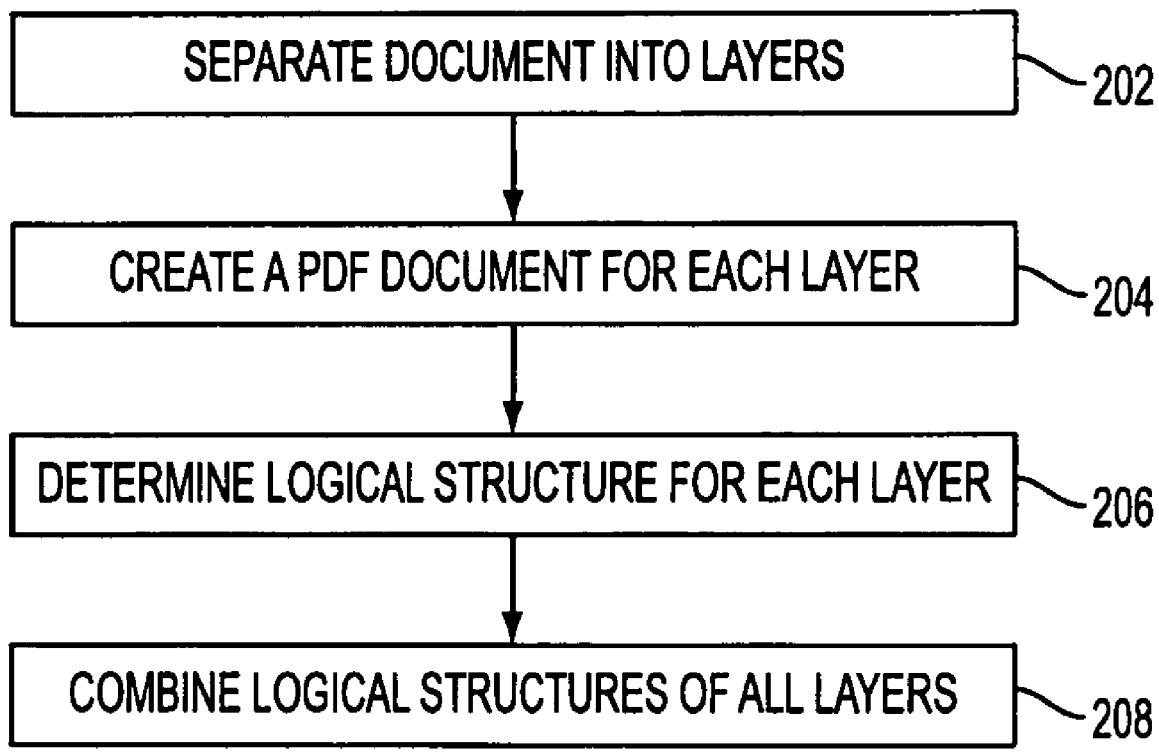
FIG. 2a illustrates a method in accordance with an exemplary embodiment for determining logical components of a document page.

A method for determining logical components in accordance with an exemplary embodiment is illustrated in FIG. 2a. A document (such as PDF document 100) may be separated into layers at step 202. The layers may include a text layer, an image layer and a vector graphics layer. A PDF document may be created for each of the layers at step 204. A logical structure may be determined for each of the layers at step 206. The logical structures from each of the layers may be combined at step 208 to determine the logical components of the document (such as PDF document 100).

Figure 2B:
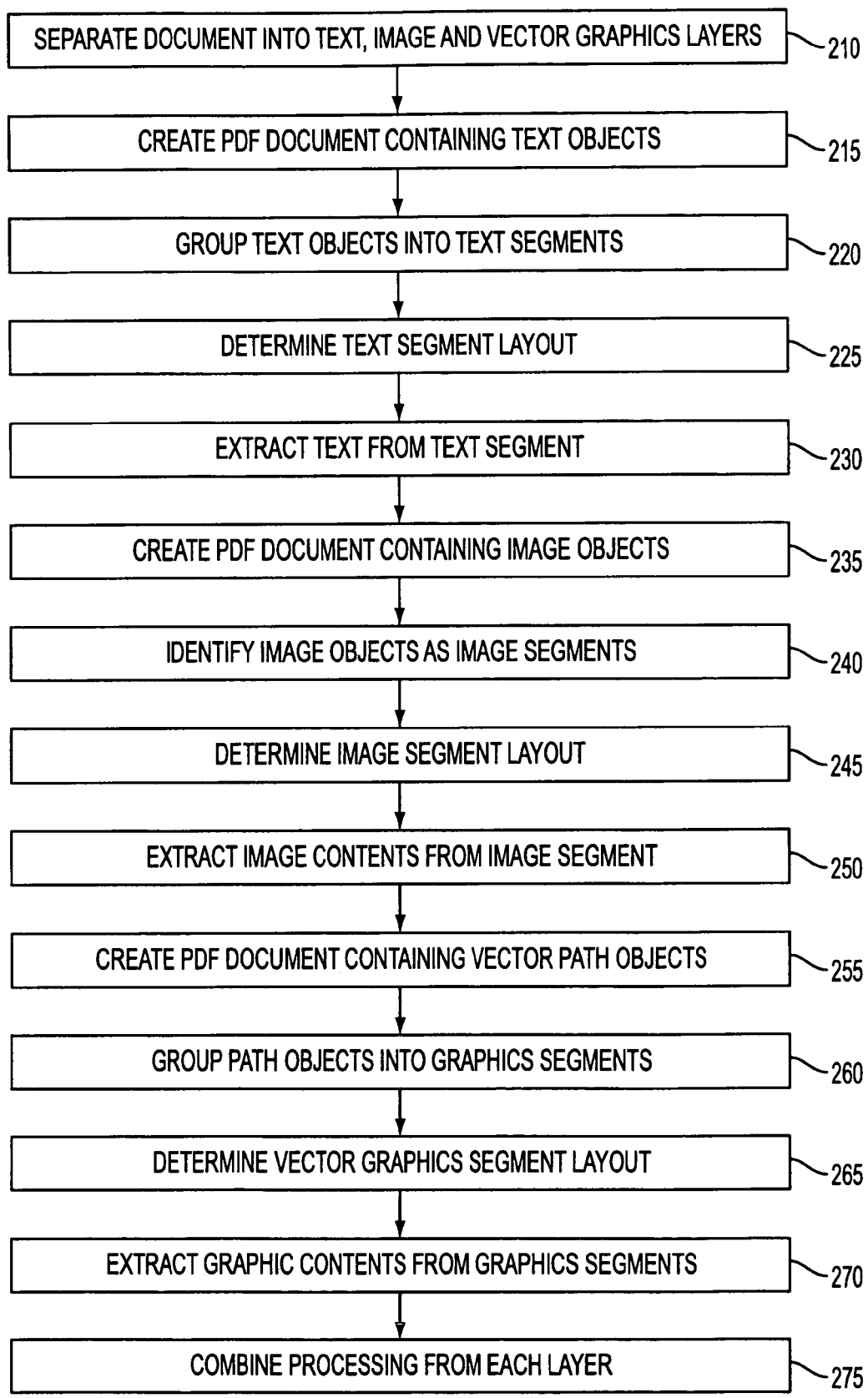
FIG. 2b illustrates another method in accordance with an exemplary embodiment for determining logical components of a document page.
Figure 3B:
Figure 4A:
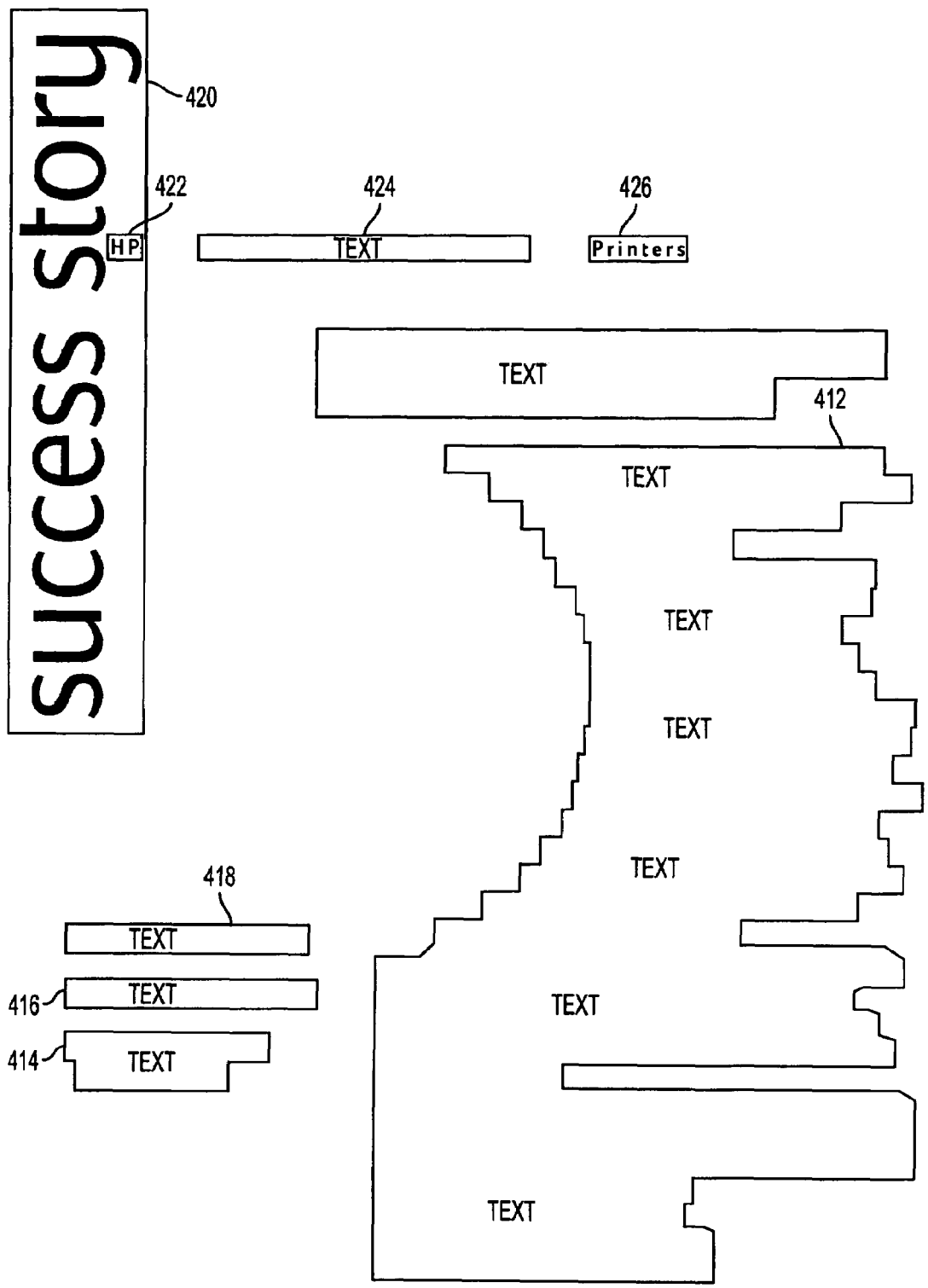
FIGS. 4a-4c each illustrate outlines and contents of the logical components for each layer of the PDF document.

In accordance with another exemplary embodiment, a method for determining logical components is illustrated in FIG. 2b. A document may be separated into text, image and vector graphics layers at step 210. A document containing only text objects 110 of PDF document 100 may be created at step 215. This document, containing all text objects of PDF document 100 is illustrated in FIG. 3a. The text objects may be grouped into text segments as logical components at step 220. A text segment layout may be determined at step 225. As illustrated in FIG. 4a, the layout may include polygon outlines 412-426. Attributes of the text may also be identified for the segments. The content within each segment may be extracted at step 230.

Figure 4B:
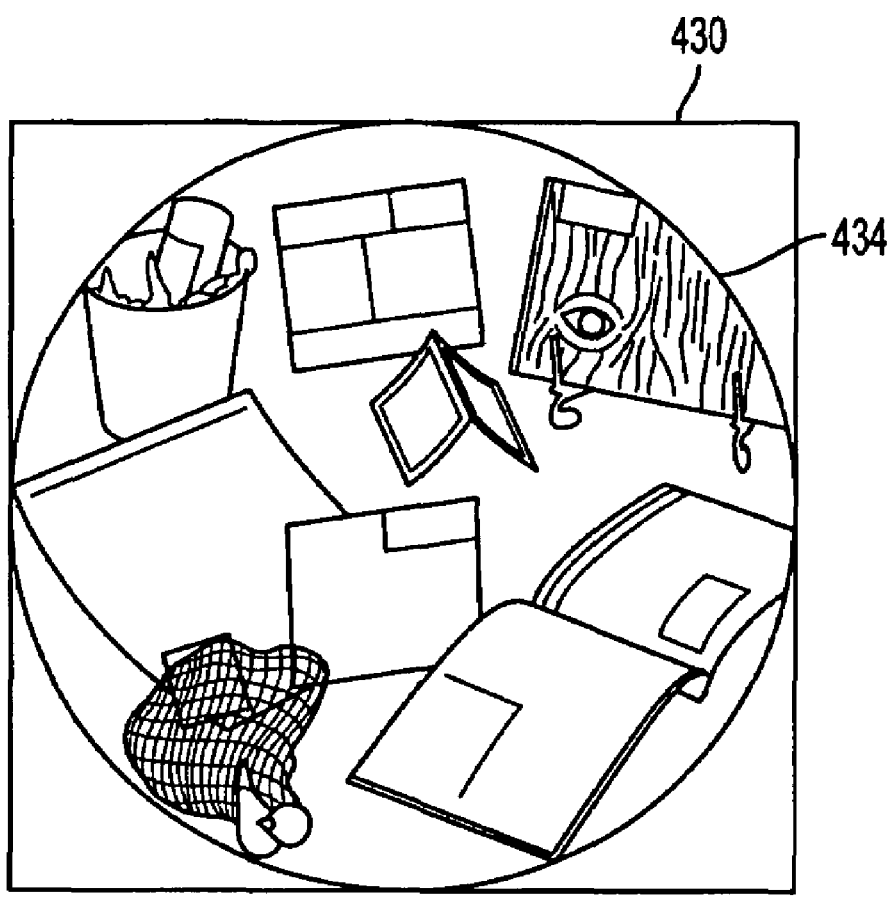

A document containing only image objects 120 of PDF document 100 may be created at step 235. This document, containing all image objects of PDF document 100 is illustrated in FIG. 3b. The PDF page containing only images may be segmented at step 240 by identifying each image object as an image segment or an image component, a logical component of the document. An image segment layout may be determined at step 245. As illustrated in FIG. 4b, the layout may include a bounding box 430, and the outline 434 of the viewable part of the image. The bounding box 430 may be the smallest rectangle that encompasses the image. The image content within each segment may be extracted at step 250 as individual image files.

Figure 3C:
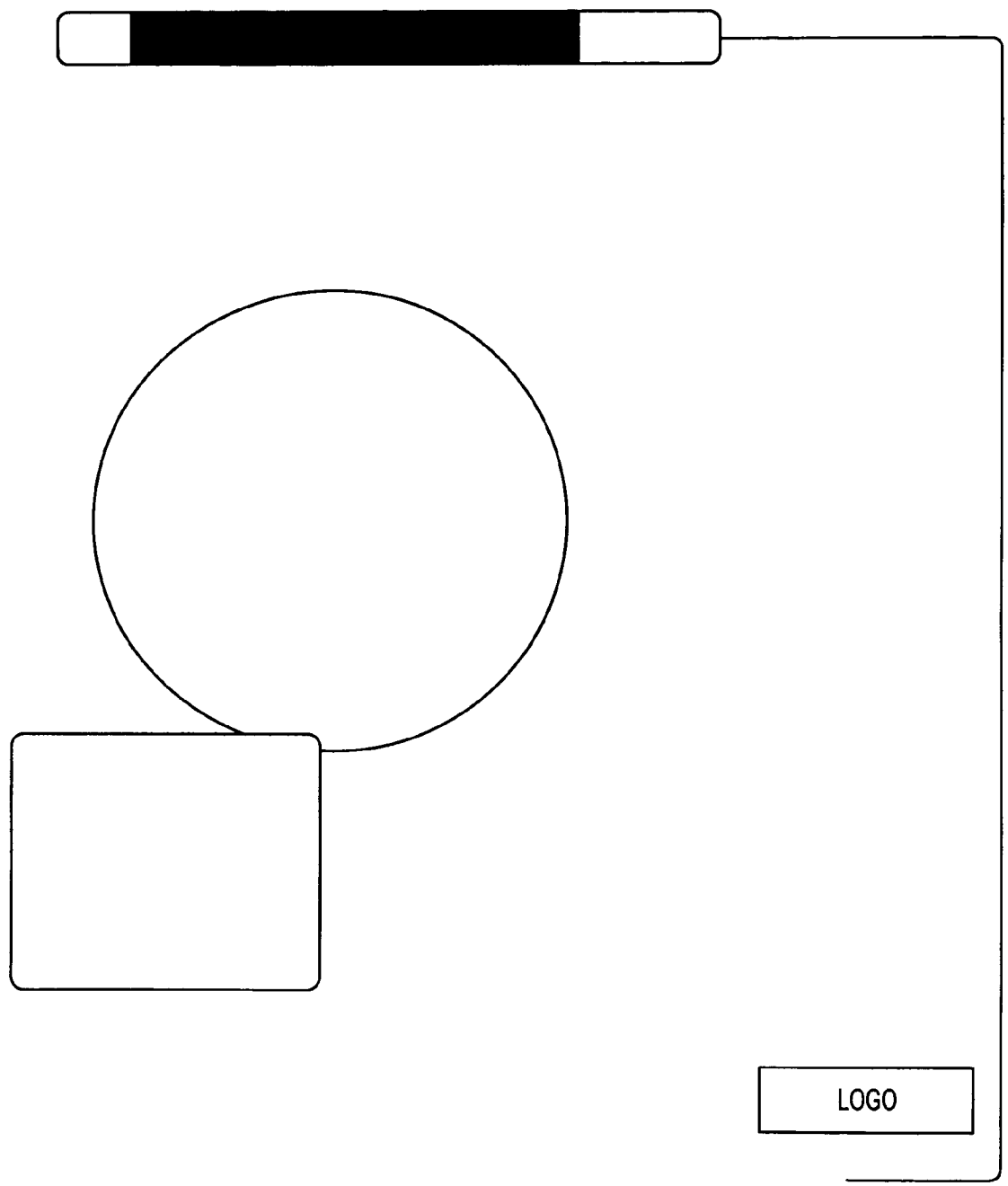
Figure 4C:
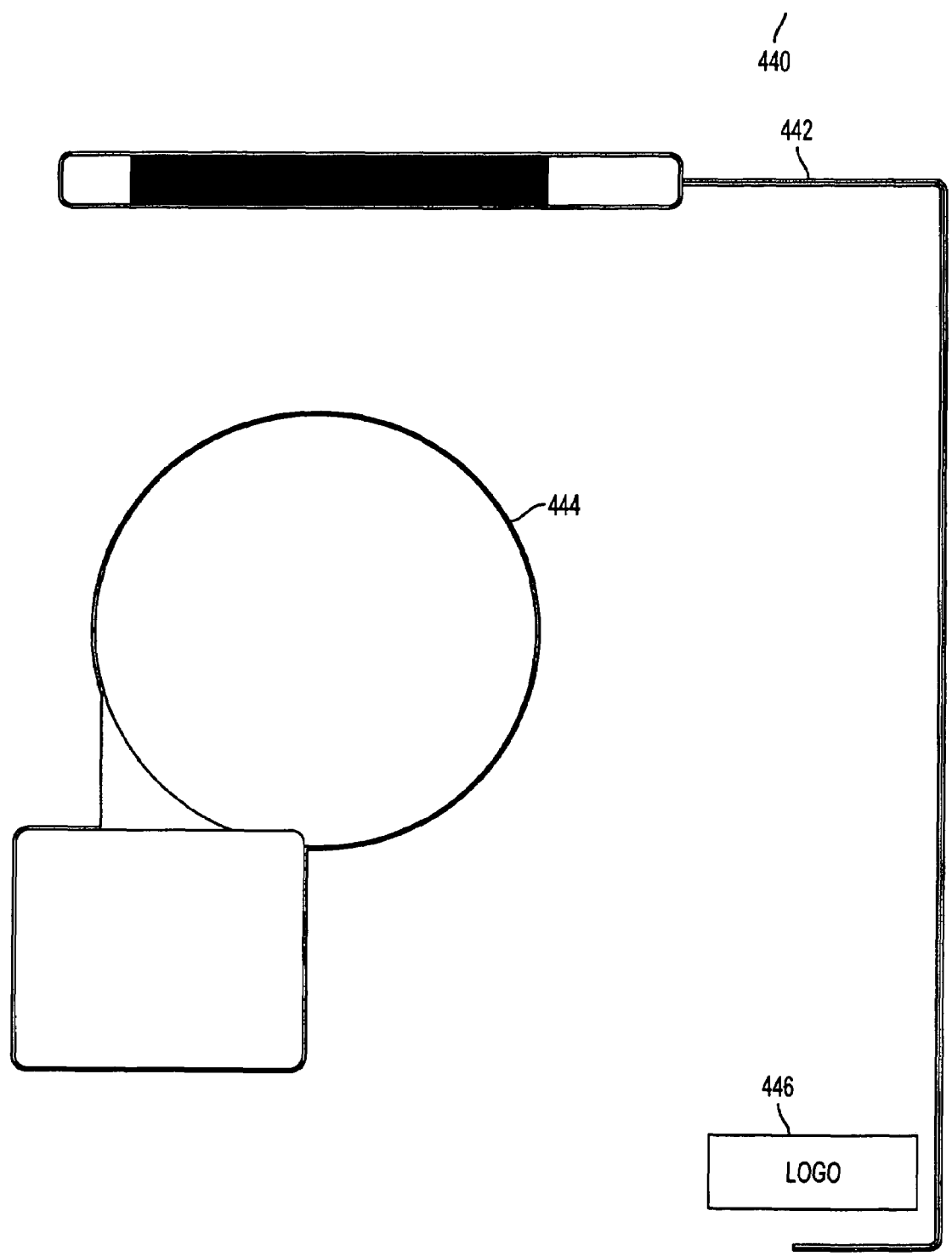

A document containing only path objects or drawings 130 of PDF document 100 may be created at step 255. This document, containing all path objects of PDF document 100 is illustrated in FIG. 3c. The path objects may be grouped into vector graphics segments as logical components at step 260. A vector graphics segment layout may be determined at step 265. As illustrated in FIG. 4c, the layout may include the polygon outlines 440-446. The contents of the vector graphics layer may be extracted at step 270.

Figure 5A:
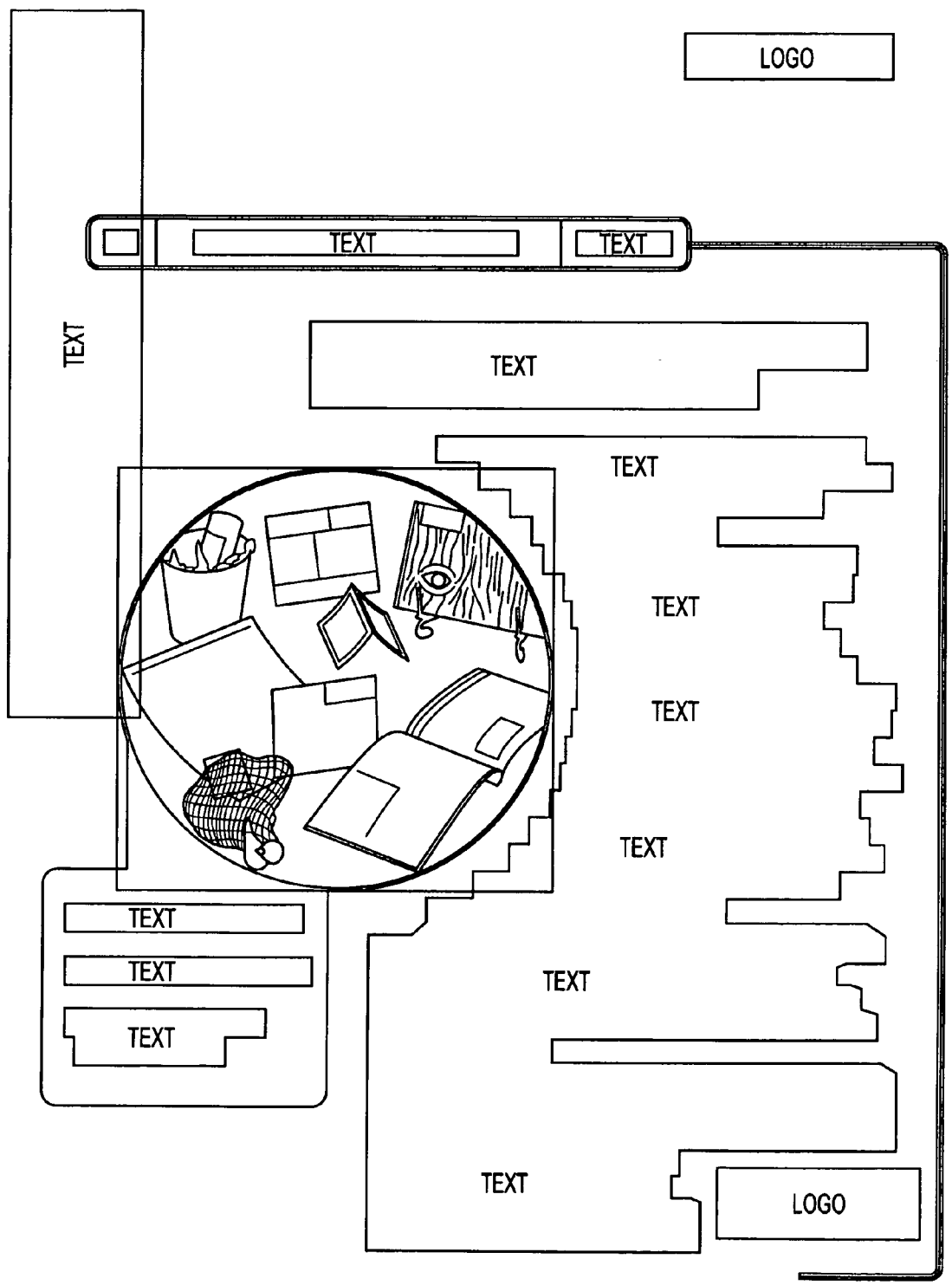
FIG. 5a illustrates the outlines and contents of the logical components for all layers of the PDF document.

The results of processing from each of the layers may then be combined to form logical components of a page at step 275. The polygon outlines of the logical components that form document 100 are illustrated in FIG. 5a.

Figure 5B:
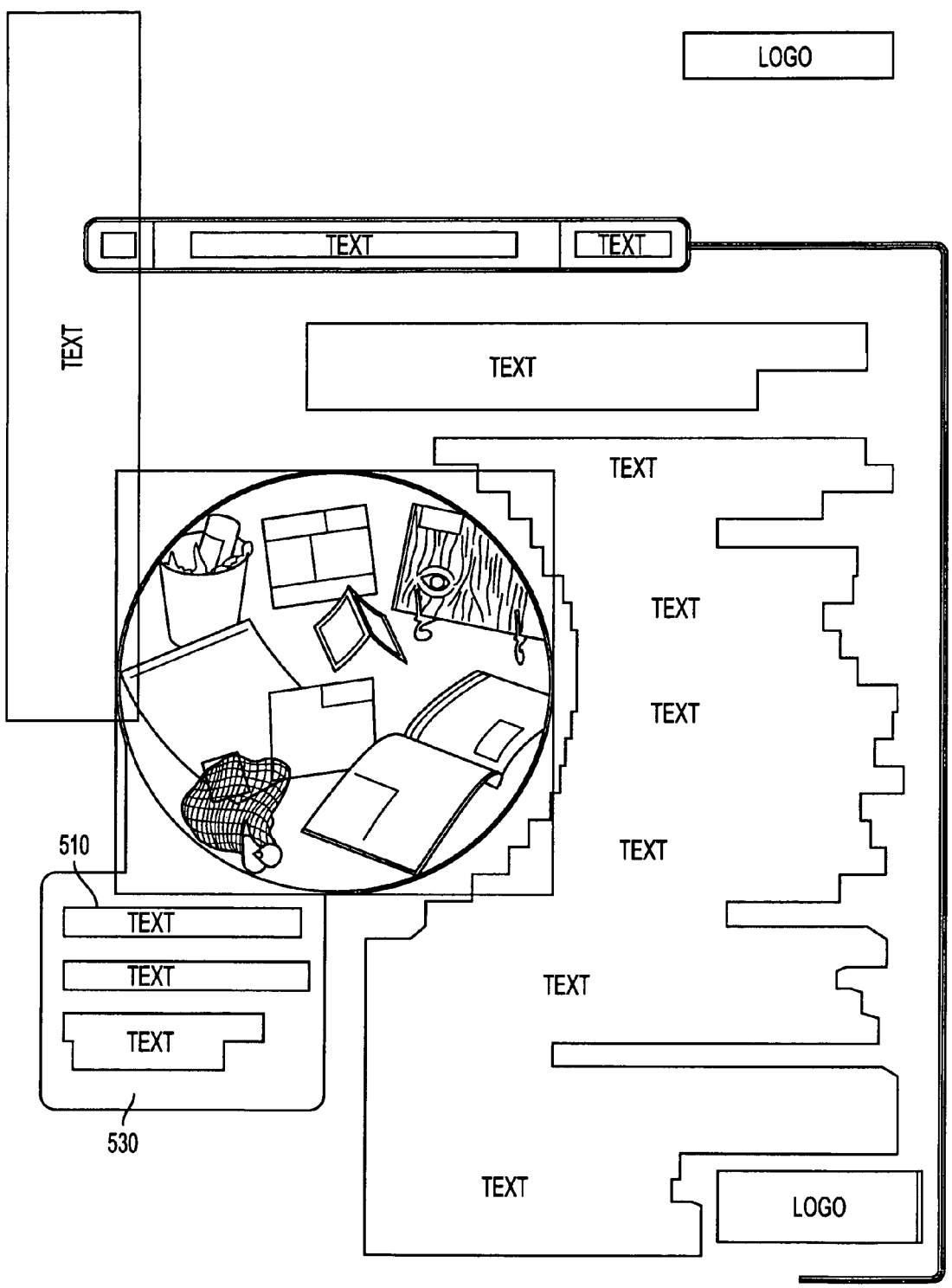
FIG. 5b illustrates overlapping components.

Logical components may simply contain text, image or vector graphics objects, identified in steps 220, 240 and 260, each placed on separate areas of the page. When one logical component is embedded in another logical component, these two logical components may be combined into one compound logical component having two sub-components. For example, a text component may be embedded in a vector graphics component such as colored shape (circle, rectangle, etc.). As illustrated in FIG. 5b, text component 510 may be placed above vector graphics component 530. In exemplary embodiments, the methods described with respect to FIGS. 2a and 2b may extract the different types of components and may preserve the order in which they are placed. The placing order may be determined by the index of the logical components. The index of the logical components is the smallest layer index of all the page objects in the logical component. Logical component with a lower index value is placed before logical components with a higher index value. For example, text object 510 has a higher index value than graphics object 530 and therefore, is placed after (i.e. in a physical sense, above) graphics object 530. This preservation negates the possibility of graphics object 530 being placed over text object 510 in which case the graphics object 530 may mask the text object 510 and make the text invisible to a viewer.

The overlap may not be limited to one logical component type embedded in another page element type—a first logical component type may partially overlap with a second logical component type or, even over another first logical component type. That is, a text component may overlap another text component. Order of the various layers may also be preserved in such cases. An example of a text component 422 being placed over another text component 420, in the form of background text, is illustrated in FIG. 4a.

Figure 6:
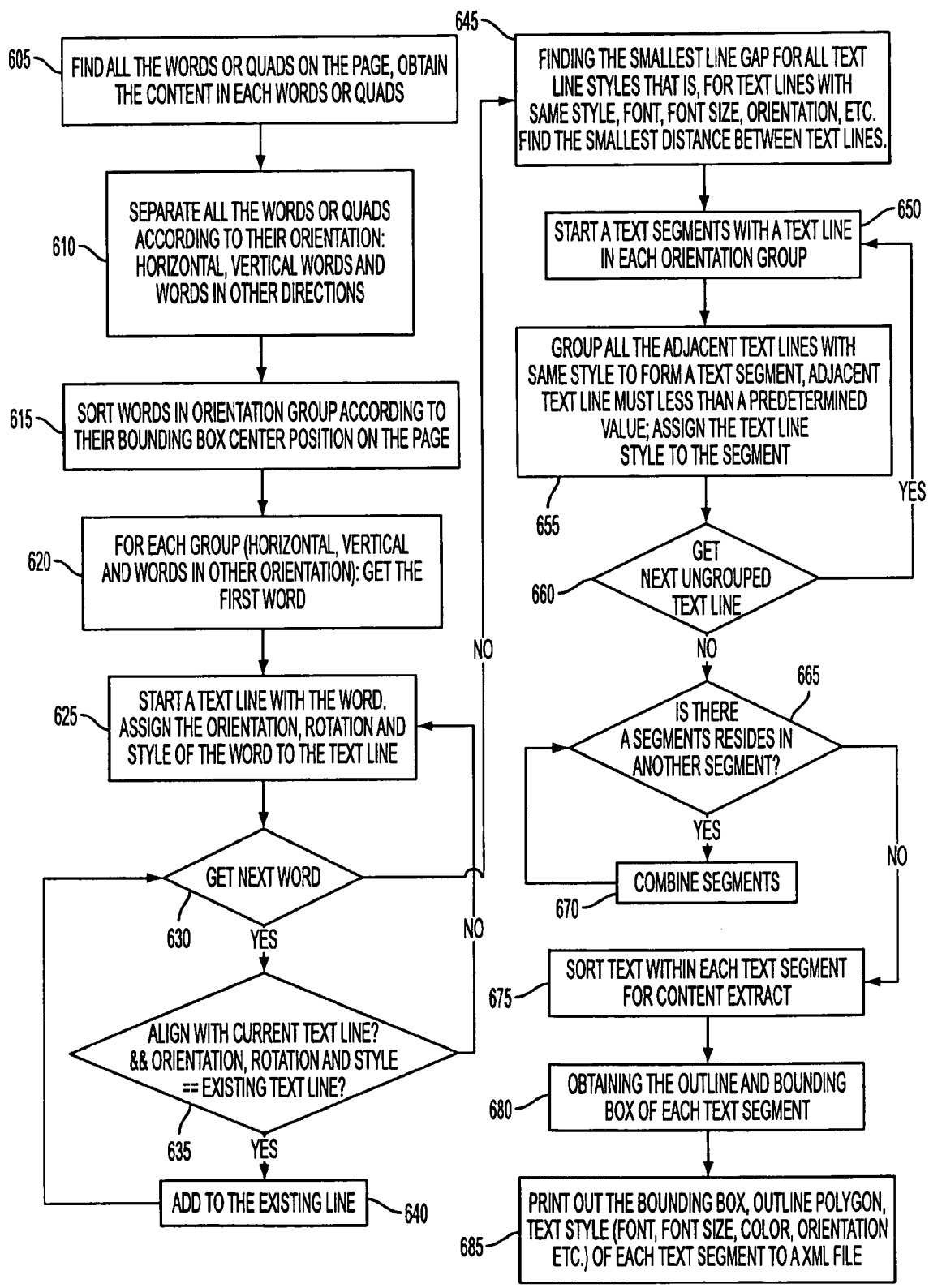
FIG. 6 illustrates a method for processing a text layer in accordance with an exemplary embodiment.

An exemplary text segmentation process may be described with reference to FIG. 6. A PDF document contains information on each character used in text such as location (coordinate position on a page) and attributes. The attributes may include font type, font size, text color, character spacing, orientation, etc. Words or quads on a page may be located and the contents of each word determined at step 605 using existing tools. One such tool may be as described in U.S. Pat. Nos. 5,832,530 and 5,832,531. A quad is a quadrilateral bounding of a contiguous portion of a word (i.e. it can be a whole word or a part of a word that is broken up at the end of a line by hyphenation).

The located words may be separated into two groups based on orientation at step 610. Orientation may be in a horizontal direction, a vertical direction or another direction such as a diagonal direction for example. The other type of orientation may also be separated into horizontal or vertical group based on the angle between the bottom line of the word and the horizontal axis of the page. If the angle is less than 45° (i.e. between 0° and 45°), then the text may be treated as having a horizontal orientation and if the angle is greater than 45° (i.e. between 45° and 90°), the text may be treated as having a vertical orientation. Words of like orientation may be grouped together. The center of each word on a page has a coordinate position.

Words belonging to each group may be sorted in step 615. Horizontal words may be sorted from left to right and then from top to bottom (similar to reading text on a line from left to right and then reading the next line). Vertical words may be sorted top to bottom first and then from left to right.

For words in each group, the first word may be retrieved at step 620. A text line may be started at step 625 using the first word. The attributes of the retrieved word may include orientation, font, color and size. These attributes may be assigned to the text line. The bounding box of the text line may be the smallest rectangle that encloses all the words in the text line. The existence of a next word may be determined at step 630. If a next word exists, it may be compared to the text line at step 635. The criteria used to make the comparison are style (font, color, size, etc.), alignment and distance. Horizontal text may be aligned at the bottom and vertical text may be aligned on the right side. The distance may be determined between the bounding box of the text line and the bounding box of the next word. In order to add the next word to the text line, this distance has to be below a predetermined value that is a function of the font size, etc. If the criteria are satisfied, the next word may be added to the text line at step 640. The bounding box of the text line may be expanded to include the new word. This process (from step 630 to step 640) may be repeated until no more words are found. If the criteria are not satisfied at step 640, a new text line may be created at step 625.

If a next word does not exist as determined at step 630, then all words are considered to have been processed and text lines have been formed. In a page of text, a number of lines may have one style (such as font, size, etc.) and a number of other lines may have another style. For each style of text lines, a line gap may be determined at step 645. A line gap may represent a shortest distance between two adjacent lines having same style, font and orientation and may be used in forming text segments.

At step 650, a text segment may be started with the first text line. At step 655, all adjacent text lines having the same style and orientation as well as distance (horizontal distance for horizontal text lines or vertical distance for vertical text lines) smaller than a pre-determined value may be added to the text segment. The pre-determined value may be a function of line gap and font size for the text style of the current text. The text line style may be assigned to the text segment. Lines that are adjacent to the added lines and satisfying the criteria, described above, may also be added to the text segment. Each text line added to a text segment may be referred to as a grouped text line. If ungrouped text lines exist as determined at step 660, a new text segment may be started as described at step 650. If there are no ungrouped text lines as determined at step 660, segments may be examined for the existence of embedded segments at step 665. This may occur with superscript and subscript for example. The processing performed to this point may have identified the superscript and subscript as individual text segments when in fact, they should be included in the text segment within which they are embedded. The embedded text segments may be combined to the main text segments at step 670. The style assigned to the combined text may be the style of the main text. In searching the outline and extracting contents of a text segment, text lines within each text segment may be sorted based on orientation at step 675. As described above, horizontal text lines may be sorted from left to right down the page. Vertical text lines may be sorted from top to bottom left to right on the page. The specifics of determining the outline of text segments with sorted text lines are described below with reference to FIGS. 7a-7f.

An outline, in the form of a bounding polygon may then be created at step 680 for each text segment. The bounding polygon and text style and orientation may be described in an output XML file at step 685. The polygons corresponding to the text segments are illustrated in FIG. 4a.

Figure 7A:
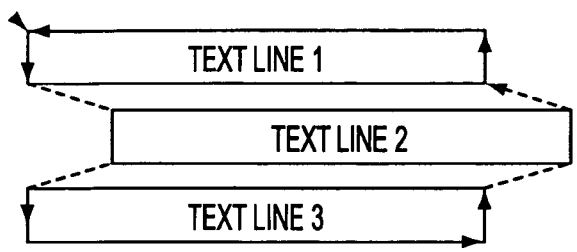
FIGS. 7a-7f illustrate identification of the outline of a text segment in accordance with an exemplary embodiment.

Text segment outlines may be traced utilizing the bounding boxes representing each text line as illustrated in FIGS. 7a-7f. As shown in FIG. 7a, the tracing of horizontal text lines may commence at the top left corner of text line 1 bounding box and continue along the left edge to the bottom left corner. The tracing may continue to the top left corner of text line 2 bounding box along the left edge to the bottom left corner. It may then continue to the top left corner of text line 3 bounding box, along the left edge and then to the bottom left corner. Assuming text line 3 to be the last text line within the segment, the tracing may continue along the bottom edge of text line 3 bounding box to the bottom right corner and then along the right edge to the top right corner. The tracing may then continue to the bottom right corner of text line 2 bounding box, along the right edge to the top right corner. It may continue to the bottom right corner of text line 1 bounding box along the right edge to the top right corner. The tracing may then follow along the top edge to the top left corner (back to the starting point in this example).

Figure 7B:
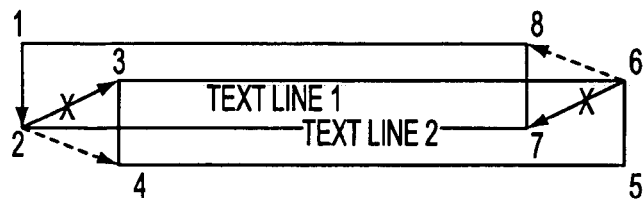
Figure 7C:
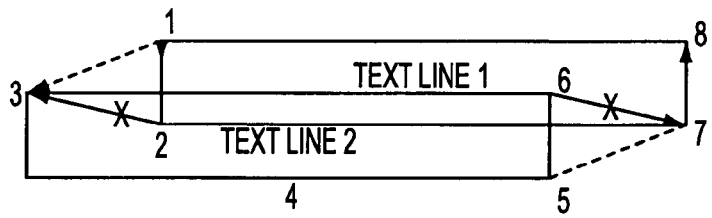

In connecting points on the left side of the horizontal text line bounding boxes, only tracing downwards may be allowed. If text line bounding boxes overlap (as illustrated in FIGS. 7b and 7c), the connection process along the left side may encounter a situation where tracing upwards may appears necessary. In this case, a point along the path may be removed. If the upward tracing is to the right (from point 2 to point 3) as illustrated in FIG. 7b, then the destination point (point 3) may be removed and the tracing continues to the next point (point 4) from the previous point (point 2) as illustrated. If the upward tracing is to the left (between points 2 and 3) as illustrated in FIG. 7c, then the origination point (point 2) may be removed and the tracing returns to the previous point (point 1) and continues to the next point (point 3) as illustrated in FIG. 7c.

In connecting points on the right side of the horizontal text line bounding boxes, only tracing upwards may be allowed. If text line bounding boxes overlap and a downward tracing appears necessary as illustrated in FIGS. 7b and 7c, a point along the path may also be removed. If the downward tracing is to the left (from point 6 to point 7) as illustrated in FIG. 7b, then the destination point (point 7) may be removed. If the downward tracing is to the right (from point 6 to point 7) as illustrated in FIG. 7c, then the origination point (point 6) may be removed.

Figure 7D:
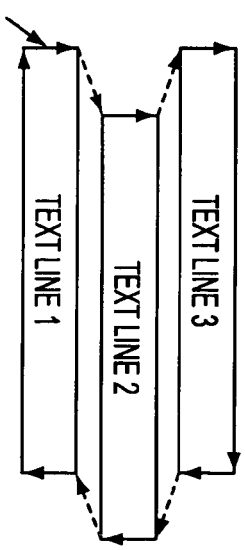

For vertical text, as illustrated in FIG. 7d, text line 1 bounding box may be traced from left to right at the top. The tracing may continue to the right over text line bounding boxes 2 and 3 and (assuming text line 3 is the last text line), down the right side of text line 3 bounding box. The tracing may then follow along the bottom of the text line bounding boxes 3, 2 and 1 from right to left in that order and then along the left side of text line 1 bounding box back to the starting point.

Figure 7E:
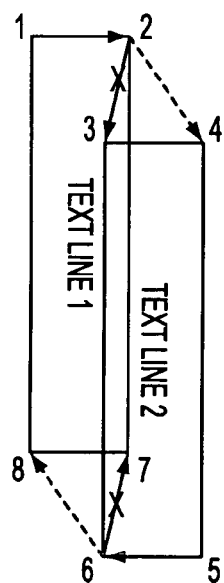
Figure 7F:
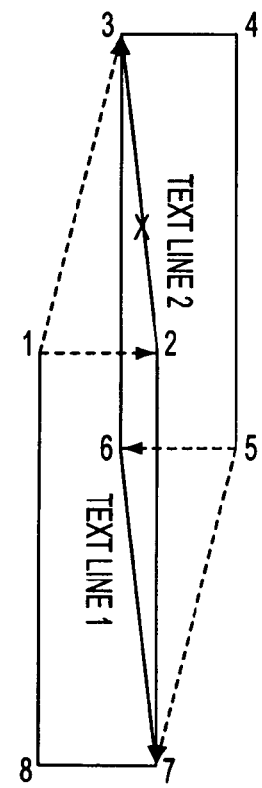

In connecting points of vertical text line bounding boxes at the top, only tracing to the right may be allowed. If text line bounding boxes overlap, as illustrated in FIGS. 7e and 7f, and a leftward tracing appears necessary, a point along the path may be removed. If the left tracing is downward, then the destination point may be removed as illustrated in FIG. 7e. If the leftward tracing is upward, then the origination point may be removed as illustrated in FIG. 7f.

In connecting points of vertical text line bounding boxes at the bottom, only tracing to the left may be allowed. If text line bounding boxes overlap, as illustrated in FIGS. 7e and 7f, and a rightward tracing appears necessary, a point along the path may be removed. If the right tracing movement is upward, then the destination point may be removed as illustrated in FIG. 7e. If the right tracing is downward, the origination point may be removed as illustrated in FIG. 7f.

In order to extract the content of each text segment, text content within the text line may be formed by concatenating the sorted words and text content within text segment is formed by concatenating the sorted text lines. Text sorting may follow the natural reading order. For horizontal words, text lines may be sorted from left to right first and then from top to bottom of a page; for vertical words, text lines may be sorted from top to bottom first and then from left to right.

A text segment may be treated as a logical component (or a text component in this case) of the document.

In another embodiment, the text only PDF document page may be converted into bitmap image and the outline of text segments may be identified using document image segmentation techniques such as the one described in U.S. Pat. No. 5,767,978. Text content of the segment may be found by searching all the text objects falling within the outline of the text segment in the PDF document or using OCR (optical character recognition) technique to find the text content within each text segment.

Image objects 120 of PDF document 100 (in FIG. 1), may be identified. Each image object may be treated as a logical component (or an image component in this case). The data stream of the image may be extracted and saved as an image file. If a mask, used to create special effects on the image such as texture and shadow, and a clipping path, describing the visible and invisible part of the image, are associated with an image, they may also be extracted. The image component from the PDF document may be expressed as a scalable vector graphics (SVG) image component and saved as an individual SVG file if the mask and clipping paths are presented. An XML file may reference the image file or the SVG image component and may describe the bounding box of the image component as well as the width and height of the image, the type of image decoder (used to decode the extracted image), the decoder parameters and the color space. Color space refers to RGB color space, CMYK color space, Gray, etc. The bounding box for an image may be a smallest rectangle encompassing the image.

In another embodiment, a PDF page containing only images may be converted to the bitmap image. The outline of the image segment may be identified using image segmentation technique and the content of the image may be the pixels within the outline.

Figure 8:
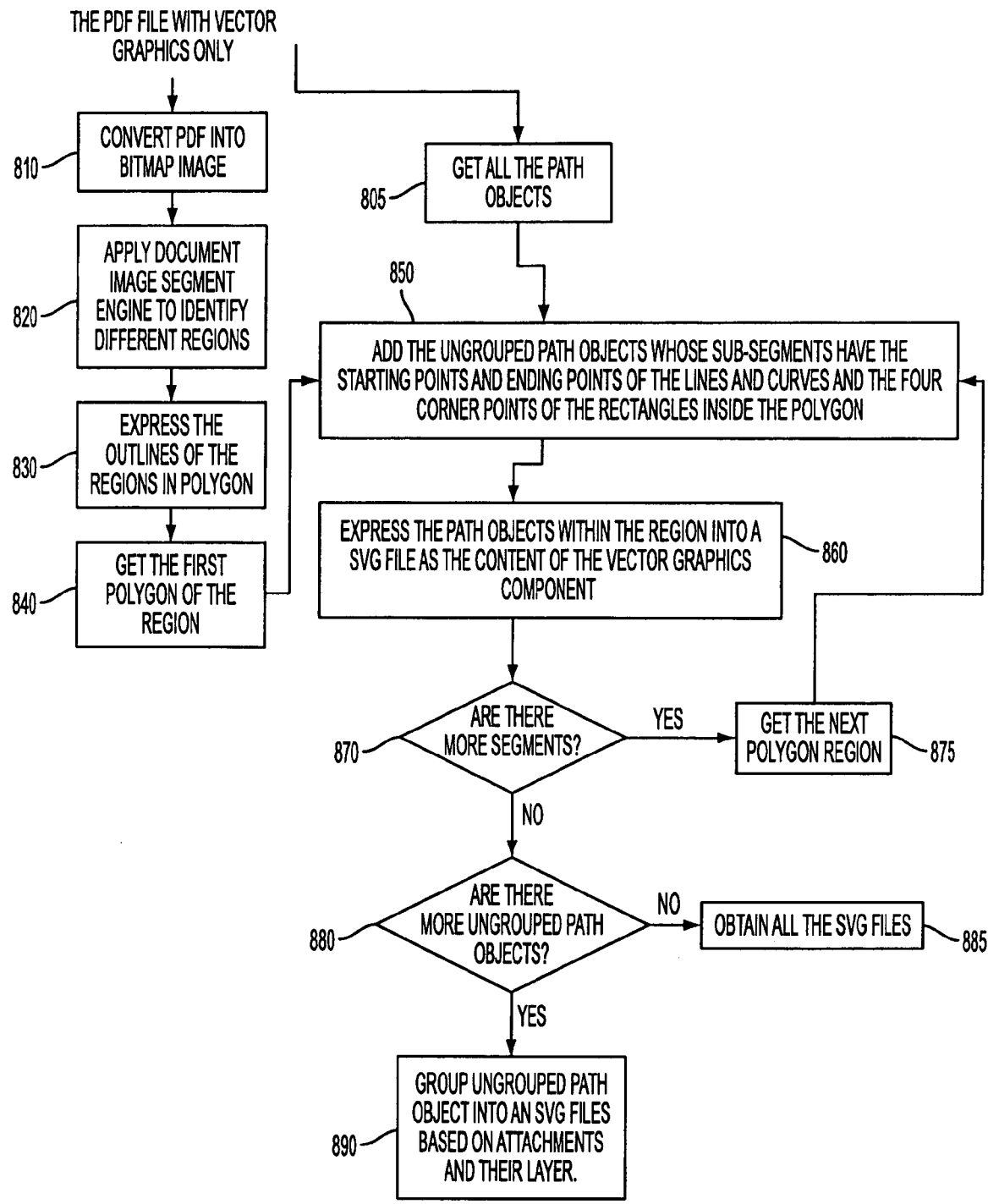
FIG. 8 illustrates an exemplary embodiment for grouping and extracting vector graphics.

An exemplary method for extracting vector graphics is illustrated in FIG. 8. A PDF document containing only vector graphics may be converted to a bitmap image at step 810. The converted image may be processed by a document image segmentation engine, such as the one described in the afore-mentioned '978 patent, to identify different regions at step 820. Each segmented region may be treated as a logical component (or a vector graphics component in this case). Each region may be referred to as a graphical illustration. The outline of each region may be the outline of the logical component and may be expressed as a polygon at step 830. A polygon for a vector graphics component may be obtained (or, retrieved) at step 840. Since drawings in a PDF document are expressed as lines, curves and rectangles, for each region, all path objects, consisting of lines, curves and rectangles, enclosed within the polygon may be identified and added at step 850.

In order to determine whether a particular path object belongs to a region, all the path objects are obtained from the PDF document at step 805 and all the points along each path object may be analyzed. With lines and curves, if the starting and ending points are within a polygon, then the lines and curves may be considered to be within that polygon. For rectangles, if the four corners of the rectangle are within a polygon, then the rectangle may be considered to be within that polygon. The path objects identified within the region are the contents of the logical component and may be marked as grouped objects.

All path objects within a polygon may be expressed as SVG components at step 860. If additional segments exist, as determined at step 870, the next polygon is obtained at step 875 and the process of steps 850 and 860 are repeated. If additional ungrouped path objects, not belonging to any region, exist as determined at step 880, they may be grouped based on the path objects' attachment and layers on the page at step 890 as described in commonly assigned co-pending U.S. application Ser. No. 10/186,692 filed on Jul. 2, 2002 and titled "Selecting Elements From An Electronic Document", the subject matter of which is incorporated herein by reference. If no ungrouped path objects exist as determined at step 880, all SVG files may be obtained at step 885.

Each vector graphics component may be an individual SVG file. The attributes of the path elements from the PDF document may be preserved. The attributes may include fill color, stroke color, stroke width and style, etc.

The segmentation results from each of the text, image and vector graphics layer may be combined into a single XML. The output of combining the various layers each with polygons and contents of the polygons are illustrated in FIG. 5.

Figure 9:
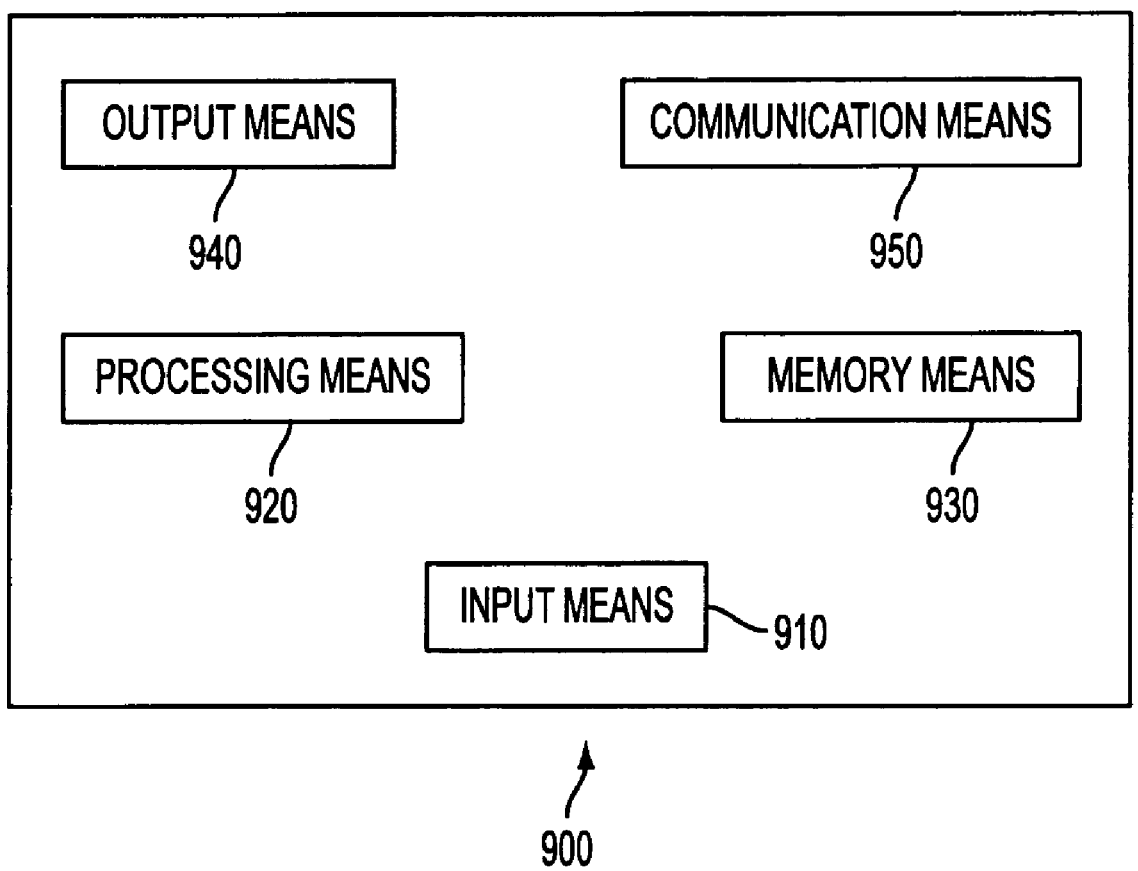
FIG. 9 illustrates a system in accordance with an exemplary embodiment.

In exemplary embodiments, the methods and processes described may be implemented on a computer such as computer 900 illustrated in FIG. 9. Computer 900 may be a handheld computer, a laptop computer, a desktop computer, or the like. Computer 900 may comprise an input means 910, a processing means 920, a memory means 930, an output means 940 and a communication means 950. A PDF document (such as PDF document 100) may be received by the computer 900 via the communication means 950; PDF document 100 may also be created (or generated) on computer 900 using the input means 910 and the processing means 920. The PDF document may be stored in memory means 930. Memory means 930 may also include a set of instructions or as an algorithm for implementing the exemplary methods described. The instructions or algorithm, when executed by processing means 920, results in the logical structure determination of PDF document 100. The logical structure information may be stored in memory means 930. The logical structure information may be viewed as a layout template within which the contents may be modified, replaced, etc. The logical structure information may be utilized to facilitate modification of the contents of PDF document 100. The logical structure information may be communicated via communication means 950 or by output means 940. Communication means 950 may be a modem, etc.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention.

The following claims and their equivalents define the scope of the invention.

The invention claimed is:

1. A method for determining logical components of a portable document format (PDF) document, the method comprising:
    separating the PDF document into a plurality of layers based on types of page objects within the PDF document;
    creating a separate PDF document for each of the plurality of layers, wherein the separate PDF documents include a separate PDF document for each type of page object within die PDF document;
    determining a logical structure for each of said separate PDF documents; and
    combining the logical structures from each of said separate PDF documents.

2. The method of claim 1 wherein the plurality of layers comprise a text layer, an image layer and a vector graphics layer.

3. The method of claim 2 wherein the text layer includes characters and words.

4. The method of claim 3 wherein the words have at least one of a horizontal and a vertical orientation and the watt arc grouped according to the orientation.

5. The method of claim 4 further comprising:
forming text lines with words have same attributes, said attributes including font type, size arid color.

6. The method of claim 5 further comprising;
forming text segments with text lines having same attributes.

7. The method of claim 6 further comprising:
creating a bounding box for each text segment.

8. The method of claim 7 wherein the bounding boxes arc polygons.

9. The method of claim 2 further comprising:
determining a rectangle for an image layer, said rectangle being of a minimum size to encompass the image.

10. The method of claim 9 further comprising
converting a graphic object to a bitmap image in the vector graphics layer.

11. The method of claim 10 further comprising:
identifying at least one zone within said bitmap image.

12. The method of claim 11 further comprising:
determining an outline, the outline surrounding said zone.

13. The method of claim 12 wherein the outline is a polygon.

14. The method of claim 13 wherein path elements within said polygon are expressed as an SVG component.

15. The method of claim 2 wherein the vector graphics layer comprises lines, curves and rectangles forming at least one graphic object.

16. The method of claim 1 wherein the plurality of layers comprise at least two of a text layer, an image layer and a vector graphics layer.

17. The method of claim 16 wherein the plurality of layers comprise identical layers.

18. The method of claim 1 further comprising:
preserving the order of the layers.

19. A system including a computer processing unit for determining logical components of a portable document format (PDF) document comprising:
means for separating the PDF document into a plurality of layers based on types of page objects within the PDF document;
means for creating a separate PDF document for each of said plurality of layers, wherein the separate PDF documents include a separate PDF document for each type of page object within the PDF document;
means for determining a logical structure for each of said separate PDF documents; and
means for combining the logical structures of said separate PDF documents.

20. A computer readable medium containing executable instructions, when executed in a processing system, cause the system to perform a method comprising:
separating a portable document format (PDF) document into a plurality of layers based on types of page objects within the PDF document;
creating a separate PDF document for each of the plurality of layers, wherein the separate PDF documents include a separate PDF document for each type of page object within the PDF document;
determining a logical structure for each of said separate PDF documents; and combining the logical structures from each of said separate PDF documents.

* * * * *

UNITED STATES PATENT AND TRADEMARK OFFICE
CERTIFICATE OF CORRECTION

PATENT NO. : 7,386,789 B2 Page 1 of 1
APPLICATION NO. : 10/787971
DATED : June 10, 2008
INVENTOR(S) : Hui Chao et al.

It is certified that error appears in the above-identified patent and that said Letters Patent is hereby corrected as shown below:

On sheet 1 of 15, in Fig. 1, delete "  " and insert --  --, therefor.

On sheet 6 of 15, in Fig. 3C, on top of the figure, insert --  --.

On sheet 9 of 15, in Fig. 4C, delete "  " and insert --  --, therefor.

In column 8, line 58, in Claim 1, delete "die" and insert -- the --, therefor.

In column 9, line 2, in Claim 4, delete "watt arc" and insert -- words are --, therefor.

In column 9, line 6, in Claim 5, delete "arid" and insert -- and --, therefor.

In column 9, line 7, in Claim 6, after "comprising" delete ";" and insert -- : --, therefor.

In column 9, line 12, in Claim 8, delete "arc" and insert -- are --, therefor.

Signed and Sealed this

Thirteenth Day of January, 2009

JON W. DUDAS
*Director of the United States Patent and Trademark Office*